(12) United States Patent
Kortum (10) Patent No.: US 10,420,349 B2
(45) Date of Patent: Sep. 24, 2019

(54) ENCASED SNACK (71) Applicant: Kraft Foods R & D, Inc., Deerfield, IL (US)

(72) Inventor: Olaf Christoph Kortum, Neubiberg (DE)

(73) Assignee: Kraft Foods R & D, Inc., Deerfield, IL (US)

( * ) Notice: Subject to any disclaimer, the term of this patent is extended or adjusted under 35 U.S.C. 154(b) by 72 days.

(21) Appl. No.: 14/792,737

(22) Filed: Jul. 7, 2015

(65) Prior Publication Data

US 2015/0305397 A1 Oct. 29, 2015

Related U.S. Application Data (63) Continuation of application No. 11/945,597, filed on Nov. 27, 2007, now abandoned.

(30) Foreign Application Priority Data

Nov. 27, 2006 (EP) ..................................... 06024515

(51) Int. Cl.
*A21D 13/14* (2017.01)
*A21D 13/31* (2017.01)
(Continued)

(52) U.S. Cl.
CPC .............. *A21D 13/31* (2017.01); *A21C 9/066* (2013.01); *A21C 11/006* (2013.01); *A21D 13/80* (2017.01);
(Continued)

(58) Field of Classification Search
CPC ..... A21C 9/066; A21C 11/006; A23L 1/0073; A23L 1/005; A23L 1/0067; A21D 13/31;
(Continued)

(56) References Cited

U.S. PATENT DOCUMENTS 3,393,074 A 7/1968 Erlich
3,989,858 A 11/1976 Williams
(Continued)

FOREIGN PATENT DOCUMENTS

EP 0576926 A2 1/1994
EP 0641520 A1 3/1995
(Continued)

OTHER PUBLICATIONS

Anonymous, Baked Kibbeh (XP002432384), available at http://bedouina.typepad.com/dovers_eye/2004/03/baked_kibbeh.html, pp. 1-3.
(Continued)

*Primary Examiner* — Kelly J Bekker
(74) *Attorney, Agent, or Firm* — Fitch, Even, Tabin & Flannery LLP (57) ABSTRACT The invention is directed to a process for the preparation of an encased snack comprising in this order the steps of (1) providing crumb material, (2) forming the crumb material under pressure to produce a shell, (3) introducing a filling into the shell, (4) forming a cover of crumb material on the filling in the shell under pressure, and (5) optionally baking the thus formed assembly. The invention is also directed to the encased snack obtainable by the process and to a mold comprising a lower die and first and second upper dies for use in the process.

14 Claims, 4 Drawing Sheets (51) Int. Cl.
*A21C 9/06* (2006.01)
*A21C 11/00* (2006.01)
*A21D 17/00* (2006.01)
*A23G 3/20* (2006.01)
*A23P 20/12* (2016.01)
*A23P 20/20* (2016.01)
*A23P 20/25* (2016.01)
*A23P 30/10* (2016.01)
*A23L 5/30* (2016.01)
*A21D 13/80* (2017.01)

(52) U.S. Cl.
CPC ........... *A21D 17/002* (2013.01); *A23G 3/203* (2013.01); *A23G 3/2015* (2013.01); *A23L 5/36* (2016.08); *A23P 20/12* (2016.08); *A23P 20/20* (2016.08); *A23P 20/25* (2016.08); *A23P 30/10* (2016.08)

(58) Field of Classification Search
CPC .... A21D 17/002; A23G 3/2015; A23G 3/203; A23P 20/20; A23P 20/12; A23P 20/25; A23P 30/10
USPC ........... 426/89, 96, 138, 275, 549, 514, 512; 264/120, 267, 259, 320; 425/412, 470
See application file for complete search history.

(56) References Cited

U.S. PATENT DOCUMENTS

| | | | |
|---|---|---|---|
| 4,650,685 A | | 3/1987 | Persson et al. |
| 4,670,283 A | * | 6/1987 | Cattani ................ A23G 9/04 264/335 |
| 4,721,622 A | | 1/1988 | Kingham et al. |
| 5,091,201 A | | 2/1992 | Murata et al. |
| 5,246,721 A | * | 9/1993 | Kerkonian ............ A21C 9/06 425/412 |
| 5,635,230 A | * | 6/1997 | Aasted ................ A23G 1/207 425/262 |
| 6,153,239 A | | 11/2000 | Thiele et al. |
| 6,406,731 B1 | | 6/2002 | Hartman |
| 6,843,168 B2 | | 1/2005 | Refer |
| 2003/0008038 A1 | * | 1/2003 | Valenzky, Jr. ........ A21C 15/02 426/94 |
| 2003/0170348 A1 | | 9/2003 | Mihalos et al. |
| 2004/0166219 A1 | | 8/2004 | Justi |
| 2006/0110514 A1 | | 5/2006 | Kortum |
| 2007/0144359 A1 | * | 6/2007 | Ekberg ................ A21C 15/02 99/450.4 |
| 2008/0166456 A1 | | 7/2008 | Kortum |

FOREIGN PATENT DOCUMENTS

| | | |
|---|---|---|
| EP | 1256280 B9 | 11/2002 |
| EP | 1658773 A1 | 5/2006 |
| FR | 2589678 A1 | 5/1987 |
| FR | 2796810 A1 | 2/2001 |
| GB | 1510996 | 5/1978 |
| GB | 2208784 A1 | 4/1989 |
| JP | S61293347 * | 12/1986 |
| WO | 0187098 | 11/2001 |
| WO | 2007080436 A1 | 7/2007 |

OTHER PUBLICATIONS

European Search Report for EP 1925212 dated May 21, 2007; 4 pages.
European Search Report for EP 1658773 dated Apr. 11, 2005; 4 pages.
Annex to the European Search Report for EP 1256280 dated Jan. 8, 2002; 2 pages.
Family Time "Crumb Crusts: Easy as Pie!"; Apr. 4, 2004; http://www.familytime.com/ShowArticle.aspx?CI=0&ArticleId=416, pp. 1-2.
Bon Appetit "Cinnamon Crumble Apple Pie" Epicurious Oct. 2003; pp. 1-3; http://www.epicurious.com/recipes/food/views/Cinnamon-Crumble-Apple-Pie-108650.
Razzle Dazzle Recipes "Oreo Ice Cream Cake Recipe", p. 1, Oct. 22, 2006; http://www.razzledazzlereceipes.com/icecream/oreicak.htm.
Rutenberg; "Starch and its Modifications" Handbook of Water Soluble Gums and Resins, National Starch and Chemical Corporation, 1980, pp. 22-26.
Fellows, P.; Food Processing Technology Principles and Practice CRC Press, 2000; pp. 380 and 383.

* cited by examiner

ENCASED SNACK

CROSS-REFERENCE TO RELATED APPLICATIONS

This application is a continuation of pending U.S. application Ser. No. 11/945,597, filed on Nov. 27, 2007, which claims the benefit of European Patent Application No. 06024515.6, filed Nov. 27, 2006, which are each hereby incorporated by reference in their entireties.

The present invention relates to an encased snack comprising a crumb material casing and a filling. Moreover, the invention relates to a process for the preparation of said encased snack.

BACKGROUND ART

Certain conventional snacks consist of baked dough material and a filling wherein the snack is usually prepared by co-extrusion of bread crumbs and the filling. However, these snacks have an irregular shape, and problems occur during baking when the filling content exceeds 40 wt. %.

Snacks having a regular shape can be obtained using a moulding process to give products with exposed fillings. In particular, EP 1 256 280 B9, assigned to Kraft Foods, describes a process for making bread snacks with a filling wherein the filling has a high water content. Such snacks have shelf-lives at chilled or ambient temperatures of more than 6 weeks. The process described therein is characterized in that ground baked bread is used as raw material. The process is said to be particularly useful for snacks on the basis of rye bread and includes the following steps:
  (i) the baked bread is ground,
  (ii) water is added to the ground bread to improve its extrudability and to adjust its water activity to about 0.95-0.98 or higher,
  (iii) the bread-water mixture is kneaded to a bread dough,
  (iv) the bread dough is coextruded with the filling and
  (v) snacks are formed, packed and pasteurized.

The water activity ($a_w$) of a substance is defined as the percent equilibrium relative humidity (% ERH) divided by 100. It can also be defined as the ratio of the water vapour pressure over the substance (p) to that over pure water ($p_0$):

$$a_w = p/p_0$$

Multiplication of the water activity by 100 gives the relative humidity of the atmosphere in equilibrium with the food:

$$ERH(\%) = 100 \times a_w$$

In practice, the water activity is a measure of "free" water in a food sample as opposed to "bound" water. Water activity merits closer attention as it is a critical factor that determines the shelf life of food products. While temperature, pH and several other factors can influence whether an organism will grow in a food and the rate at which it will grow, water activity may be regarded as the most important factor. Most bacteria do not grow at water activities below 0.91, and most moulds cease to grow at water activities below 0.80. By measuring the water activity of foodstuffs, it is possible to predict which microorganisms will or will not be potential sources of spoilage.

US 2006/0110514 A1, assigned to Kraft Foods, on the other hand, discloses shaped snacks made from baked dough crumbs. In particular, this reference describes a process for shaped snacks comprising the steps of shredding baked dough material, forming the shredded baked dough material to produce a shell, and introducing the filling into the shell.

None of the prior art snacks endures heat treatment after assembly, which would result in beneficial taste and appearance. Since consumers are interested in snacks that are appealing and shelf-stable without preservatives and, at the same time, have a high filling content wherein the filling is fully encased with crumb material, there was the need to develop new processes for the preparation of such snacks.

In view of the knowledge about the prior art snacks, the present inventors have created a process for the preparation of an appealing snack comprising a crumb material casing and a filling wherein the encased snack has an evenly shaped surface, a long shelf-life, and does not need preservatives.

DISCLOSURE OF THE INVENTION

In accordance with the present invention, there is provided an encased snack comprising a crumb material casing and a filling.

The invention also pertains to a process for the preparation of an encased snack comprising in this order the steps of
  (1) providing crumb material,
  (2) forming the crumb material under pressure to produce a shell,
  (3) introducing a filling into the shell,
  (4) forming a cover of crumb material on the filling in the shell under pressure, and
  (5) optionally baking the thus form assembly.

In one embodiment, each of the crumb material and the filling of the encased snack has a water activity of 0.60 or more, preferably 0.85 or more and more preferably of from 0.93 to 0.98.

Moreover, the present invention is directed to a mould which is suitable for forming the crumb material under pressure to produce a shell and for forming a cover of crumb material under pressure.

It has been found that the encased snack of the invention is capable of exhibiting an improved shelf-life still providing an improved taste and appealing appearance after prolonged storage, especially for encased snacks having a water activity of 0.90 or more and using refrigerated storage.

DETAILED DESCRIPTION OF THE INVENTION

The process of the invention enables the manufacture of a range of encased snacks comprising a crumb material casing and a filling. The process of the invention comprises the following steps:
  (1) providing crumb material,
  (2) forming the crumb material under pressure to produce a shell (3) introducing a filling into the shell,
(4) forming a cover of a crumb material on the filling in the shell under pressure, and
(5) optionally baking of the thus formed assembly.

Optionally, the process according to the invention may comprise an additional step of adding water to enhance stickiness of the crumb material at shell formation or to compensate water loss due to the optional baking step and to adjust the water activity of the final snack to a target level of preferably 0.60 or more, more preferably 0.85 or more and even more preferably of from 0.93 to 0.98.

Crumb material as used in the present invention includes any eatable material in crumb form, i.e. free flowing eatable crumbs, such as shredded baked dough material, breadstuff, cereal-based material, deficient waste material from snack production, cheese or meat-based material, soy protein or tofu-based material or a combination of any of these in the form of free flowing crumbs.

Step (1) of providing crumb material can be conducted by any suitable means. If the crumb material is derived from baked dough material, step (1) can be conducted by shredding baked dough material by any suitable means, such as a rotating knife cutter or a high shear mixer, as exemplified by a Stephan cutter.

The baked dough material may be any baked dough material selected from the group comprising cake, biscuits, bulked-baked bread such as rye bread, white bread, toast, brioches, rolls and cookies or a combination of two or more thereof. The baked dough material is preferably rye bread or biscuit dough.

Breadstuff as used in the present invention includes pretzel sticks, potato chips and peanut flavoured puffed corn products etc.

Cereal-based material may be any grain-based material including cornflakes, oat flakes, oat bran, wheat whole seeds roasted and/or coated with sugar, muesli and may comprise nuts and/or fruit pieces or further components.

Cheese-based material can be derived from any known cheese or dairy material and includes dry parmesan cheese, pizza cheese, non-melting cheese and process cheese-based powder.

Meat-based material includes cooked, cured, dried, fried, baked or raw meat such as minced meat or salami.

The crumb material may contain or be supplemented with further components such as, flavours, colorants, fat binding fiber material, such as oat material, binders such as hydrocolloids, etc. Examples for such further components are flour, dried glucose syrup, egg white powder, raw dough, gelatine or starches of any nature. Especially, pre-gelatinized starch has proven suitable to enhance the stability of the snack casing at make. It is preferable that the crumb material contains binders reacting with water, such as pre-gelatinized starch. The binder enables the outer surface of the encased snack to firm-up and to become more appealing at the end of the process according to the present invention. Moreover, the additional components such as binders and/or fat binding fiber material improve the flowability.

Preferably, the additives (excluding water) amount to 50% by weight or less, more preferably 30% by weight or less, even more preferably 10% by weight or less, most preferably 5% by weight or less, based on the weight of crumb material plus additives.

If the material used as crumb material is shredded, the additional components may be added before, during or after shredding, depending on the form of the components. If the additional components are added after shredding, it is convenient to mix the components and the crumb material accordingly.

Depending on the type of crumb material and additional components, the encased snack according to the invention may be soft or crunchy.

Figure 1A:
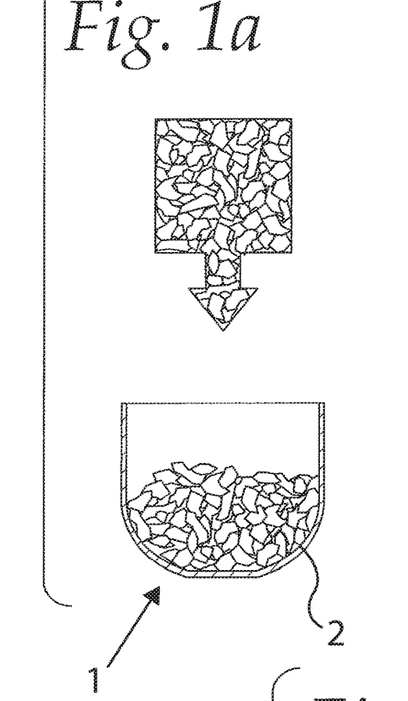
FIG. 1a-1g illustrate an embodiment of a process for the preparation of the encased snack of the present invention using a mould 1 comprising a lower die 2 and a first and a second upper die 3 and 4.
Figure 1B:
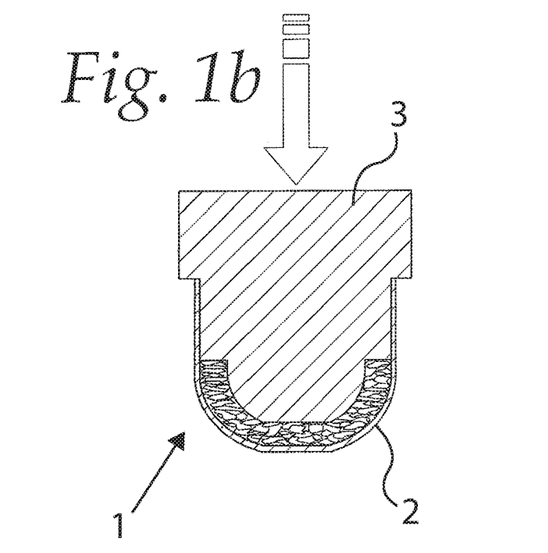
Figure 1C:
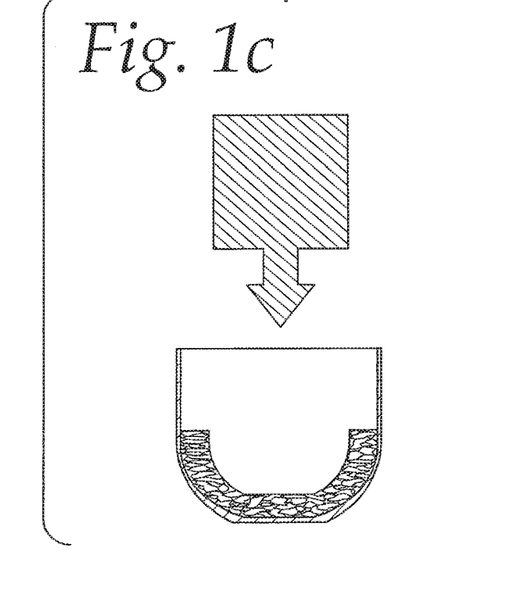
Figure 1D:
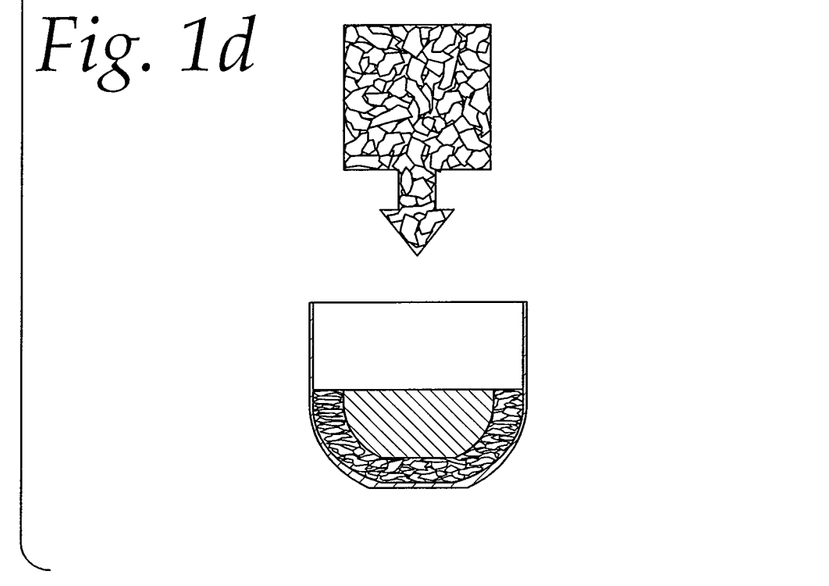
Figure 1E:
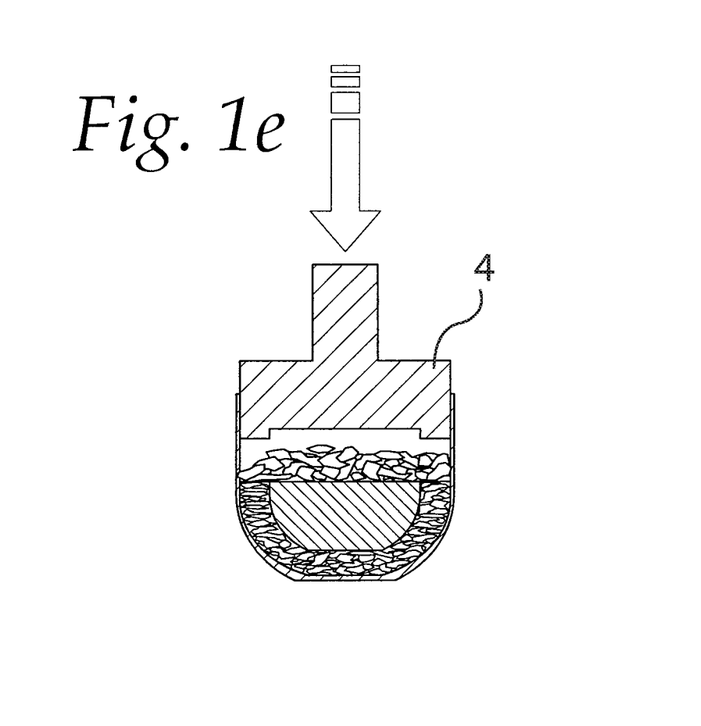

The shell forming of the crumb material happens under pressure. To produce a shell in accordance with step (2) of the process according to the present invention the first upper die 3 is pressed into the lower die 2 (see FIG. 1b) at a pressure of preferably between 1 and 10 bar depending on the crumb material. For rye bread crumbs the pressure is preferably between 4 and 6 bar, for biscuit crumbs the pressure is preferably between 3 and 5 bar.

In step (2), the crumb material preferably has a temperature of between 0° C. and 80° C., more preferably of between 10° C. and 25° C.

Introducing the filling into the shell according to step (3) can be conducted by any suitable means, such as extruding the filling into the shell by means of an automated process or with a piston dosing pump. Even distribution and accurate dosing of any filling is desired and this can be accomplished by conventionally known means.

The filling according to the invention can be any one selected from the group consisting of chocolate, fruit, dairy products, vegetables, vegetable-based materials such as sauces including ketchup and mustard, cereals and meat-based material as well as vegetable-based fat or protein spreads like soy or a mixture of one or more of any of these. Chocolate includes any dark or white varieties, with or without pieces and could be of soft spreadable or solid consistency. Examples of fruit usable in invention include whole fruit or fruit pieces, purees or pastes, dried fruit, juice concentrates and mixtures thereof. Fruit includes choke berry, cranberry, blueberry, plum, black currant, strawberry, apple, green grape, goose berry, peach, red currant, orange and green pear or mixtures of one or more of any of these. Dairy-based fillings can be derived from whole milk concentrates, reduced fat milk concentrates, fat free milk concentrates, skim milk concentrates, milk protein concentrates, fat-enriched milk protein concentrates, cream, anhydrous milk fat, concentrated milk fat or butter, whey concentrate, whey protein concentrate, fat enriched whey protein concentrate, yoghurt, cultured curd and cheese varieties, or mixtures of one or more of any of these and also in combination with other food ingredients. Cheese according to the invention includes any cream cheese, natural, ripened and processed cheese. Dairy-based products could be added in liquid form, as a semi-viscous spread that may be aerated or as firm/pre-shaped pieces or in a shredded/powdered form and could be flavoured with herbs and spices in any direction. Meat-based fillings according to the invention include ingredients like raw, cured, smoked or cooked meat of any acceptable animal origin in combination with other food ingredients. They could be added as a pre-shaped sausage or pieces thereof or as a spread and could be flavoured with herbs and spices in any direction.

Preferred examples of savoury filling include dairy and meat-based or vegetable ingredients or combinations thereof that could be stabilized and preserved with conventionally known food ingredients. Sweet fillings include dairy, fruit or chocolate ingredients or combinations thereof that may be stabilized and preserved with food ingredients known in the art.

If desired, the process according to the invention may comprise an additional step of solidifying the filling after introduction into the shell by cooling, for example when chocolate or melting fat based spreads are used as fillings.

It is preferable that the water activity of the filling corresponds to the water activity of the crumb material, i.e the shell and cover material, to prevent moisture migration at storage. The water activity of the filling is thus preferably 0.60 or more, more preferably 0.85 or more and even more preferably of from 0.93-0.98

The encased snack according to the invention preferably comprises 10 wt. % or more of the filling, more preferably 30 wt. % or more of the filling and even more preferably 40 wt. % or more of the filling, based on the weight of the snack.

Forming the cover of crumb material on the filling in the shell under pressure (step (4)) can be conducted using the same crumb material as used to produce the shell. Yet, the crumb material can also be different and may be selected from the group of crumb materials described above. Additional components, which may be selected from the group of additional components defined above, may be added to the crumb material for the cover with the same preferences as discussed above.

To produce the cover of the snack in accordance with step (4), a second upper die is used that will be described below. This step is conducted by providing crumb material as a layer on the filling and gently compressing said layer on top of the filling at a pressure of about 1 to 2 bar.

The design of the upper dies depends on the dimension of the lower die and determines wall thickness and stability of the casing. To enable the production of an optimally encased snack, it is advantageous if the top rim of the first upper die is designed conically with an inversely tilted angle, preferably in the range of about 45° to 60° (see FIG. 4a). The angle is adjusted based on the snack size and on the desired cover thickness. Corresponding to the design of the first upper die, it is preferable if the second upper die has an exposed rim having a height h of 1 to 2 mm at a width w corresponding to the wall thickness of the shell to ensure that the pressure is enforced to the edges of the earlier produced shell (see FIG. 4b).

The dies can be made of any suitable material, preferably metal. It is preferable that the dies are coated with Teflon or other anti-sticking material. The dies can have an in-built temperature-adjustment, i.e. cooling and/or heating element. The use of heat at pressing allows a more specific stabilisation of the shell and cover produced. The dies can preferably allow for a temperature variation of between −10° and 250° C. The properties of the encased snack can be adjusted, inter alia, by the die temperature, the pressure applied and the residence time of the dies in touch with the crumb material.

Figure 1F:
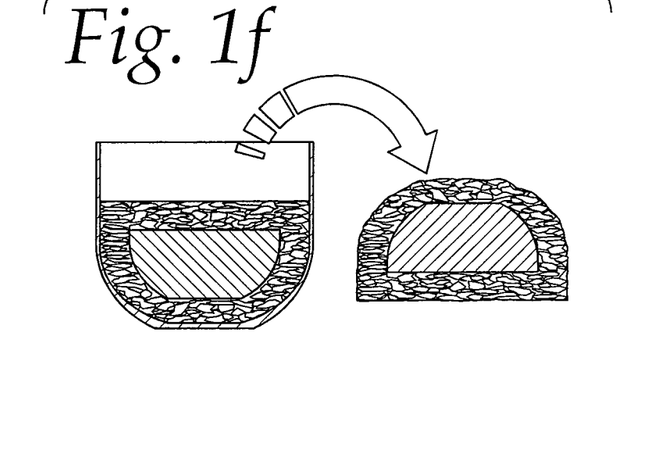
Figure 1G:
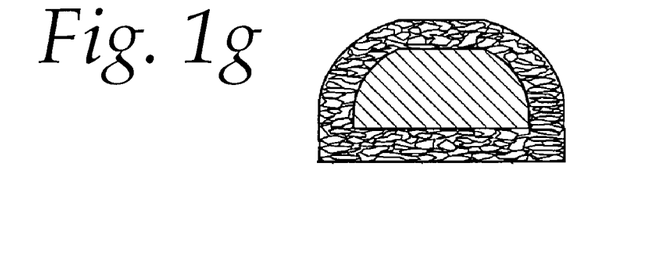
Figure 2:
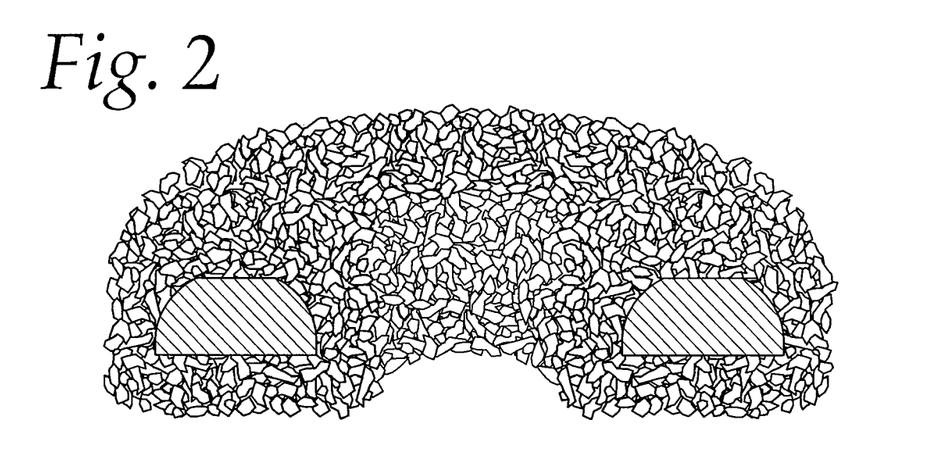
FIG. 2 illustrates an example of an encased snack of the present invention.
Figure 3:
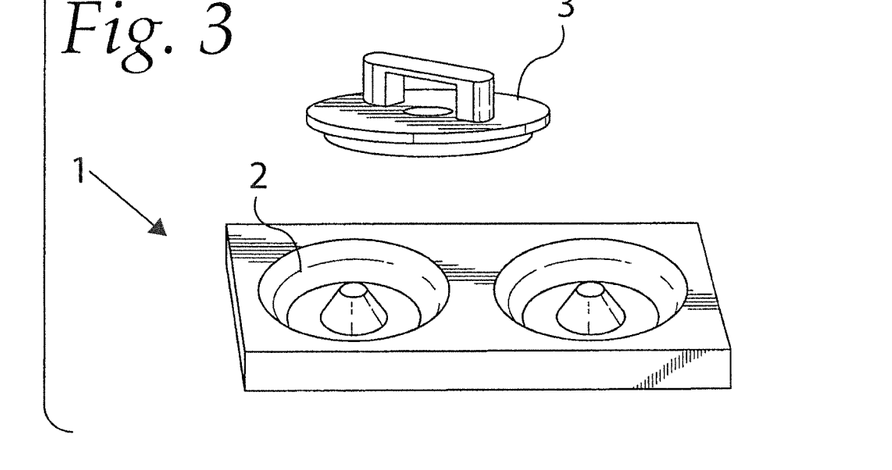
FIG. 3 illustrates a mould 1 comprising a lower die 2 and a first upper die 3 which is suitable for forming the crumb material under pressure to produce a shell according to the present invention.

After forming the cover of crumb material in step (4), the thus formed assembly can be removed from the mould before the optional baking step. However, the optional baking step can also be conducted in the mould with or without an upper die. If the assembly is taken out before baking, it is preferable to put the assembly upside down, i.e. with the cover formed in step (4) pointing downwards (see FIG. 1f).

The optional baking step (5) can be conducted in any conventional oven, however, baking is preferably carried out using infrared radiation because it is advantageous to achieve quickly the desired temperature of 80-90° C. at the shell/cover surface without overheating of the snack filling. For dough casings having a wall thickness (i.e. a thickness of the shell and/or of the cover) of 3-5 mm, IR heat enables baking within less than 2 minutes. For this purpose, an IR Module from Heraeus Noblelight can be applied consisting of 9 shortwave dual tube infrared radiators made of quartz glass and golden reflectors. These tubes arranged in a housing sized 930×500×240 mm provide an area performance of 108 kW/m$^2$ at maximum power absorption of 37.5 kW. After releasing the snacks from the mould onto a conveyor belt sufficient surface baking can be accomplished within 1.5 min residence time underneath the IR module when using only 50% of maximum power. Conventional baking ovens can be used as well for free snack baking at 235° C. within 5-6 minutes or baking in the mould within 7-8 minutes.

Additional steps may be employed in the manufacturing process of the invention, for example spraying water or liquid binder solutions (that may contain egg or starch or any other food ingredient-derived adhesive material) on the snack and/or coating the snack with, e.g., sesame, poppy seed, nuts etc. before or after the optional baking step. Such coating can be conducted during snack formation. That is, e.g., sesame, poppy seed or nuts can be provided in the mould of the invention before the crumb material is filled into the lower die of the mould to be formed into a shell. Coating the encased snack can, on the other hand, also be carried out after assembly of the snack, for example by applying an icing or by means of a chocolate enrobing process.

In other words, the process of the invention is suitable for the preparation of encased snacks, both coated and uncoated, containing a wide variety of fillings like chocolate, fruit, dairy products, cereals and meat-based material as well as vegetarian soy or a mixture of two or more.

The snacks according to the invention can have a high filling content, a constant filling/dough ratio and are evenly shaped. In addition, the snacks according to the invention have an appealing surface and have an increased shelf-life under chilled and ambient conditions and do not require preservatives, when handled in a clean manner after the optional baking step until final packing. Packaging could be arranged under modified atmosphere conditions to prevent eventual mould growth. However, preservatives like sorbic or propionic acids or alcohol spraying can be applied for the case that hygienic conditions prior to packaging can not be maintained in a clean manner.

Further below, the mould in accordance with the invention will be described.

Figure 4A:
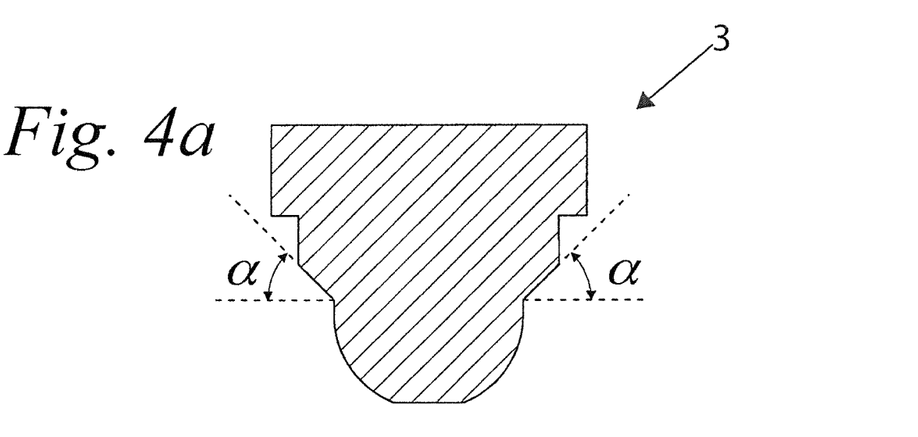
FIGS. 4a and 4b show an embodiment of first and second-upper dies 3 and 4, providing a sealed snack casing.
Figure 4B:
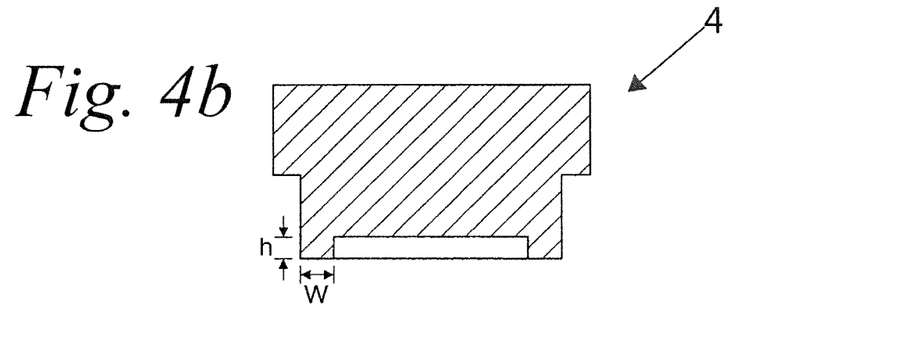

Mould 1 of the invention comprising a lower die 2 and a first and a second upper die 3 and 4 is suitable for use in formation steps (2) and (4), respectively, of the process according to the invention. The first upper die 3 is preferably designed such that the top rim is conical with an inversely tilted angle, preferably in the range of about 45° to 60°, as shown in FIG. 4a. The angle depends on the snack size and on the desired cover thickness. The second upper die 4 has an exposed rim having a height h of preferably 1 to 2 mm at a width w corresponding to the wall thickness of the shell to ensure that the pressure is enforced to the edges of the previous produced shell (see FIG. 4b). The lower die 2 can have any shape depending on the upper dies 3 and 4 and the snack to be produced.

The form and the outer appearance of the snack, its size and its wall thickness are determined by the mould that is used. It is preferable that the shell/cover thickness is between about 1 to 9 mm, preferably between about 1.5 and 7 mm and more preferably between about 2 to 5 mm. The snack can have any suitable form such as a bar or a bagel. It is preferable that the snack has an overall weight of between about 10 and 200 g, preferably between about 20 and 100 g. It is noted that the surface of the shell and the cover can have an embossing that is stamped into said surface during shell and/or cover formation if the lower and/or second upper die has an appropriate pattern.

EXAMPLES

Following below, specific embodiments of the process and an encased snack of the invention are exemplified.

(i) Determination of Water Activity ($a_w$)

The water activity ($a_w$ value) is determined at 25° C. using the instrument AquaLab Model XC-2 and following the manufacturer's instructions for the instrument. The linear offset of the instrument is verified against known salt standards, one of which displaying an $a_w$ above that of the sample and the other one displaying an $a_w$ below that of the sample. The $a_w$ of a distilled water has to be 1.000±0.003. The measurement of the $a_w$ value of the sample is repeated until two successive values differ by less than 0.003. The $a_w$ value assigned to the sample is the average of those two values.

Example 1—Preparation of Filled Soft or Crunchy Cookie/Cereal Bars

Filled soft or crunchy cookie/cereal bars were prepared according to the following protocol and using the ingredients and amounts shown in Table 1.

Procedure:
1. Shred cookies or cereal/dried fruit or nuts-based muesli mix into crumbs via a Thermomix (Vorwerk) to target crumb size of 1-2 mm.
2. Mix-in dry food ingredients (i.e. egg white powder, biscuit flavour Silesia, nut flavour Quest, Glucose syrup type binder, cold swell pre-gelatinized starch or flour) to create crumb material.
3. Spray water directly into the mix and distribute by gently mixing.
4. Fill crumb material thus obtained and optionally nuts into the lower die as first layer, press first upper die at ambient temperature at around 0.6 bar for 2 seconds to create shell, add chocolate or milk-cream filling into the shell.
5. In the case of chocolate filling: cool to solidify the chocolate via 5 min cooling with blasting cold air.
6. Add crumb material on top and fix with gently pressing at 2 bar via ambient temperature cover former (second upper die) for 2 seconds.
7. Take out of mould and check weight; spray water on top if a softer casing is desired.
8. Bake free for 1 to 1.5 min via IR baking module at 50% power set of 37.5 kW unit.
9. Let cool and package.

TABLE 1

|  | hard/crunchy | soft | soft |  |
| --- | --- | --- | --- | --- |
|  | g | g | g | g |
| Oreo cookie crumbs | 373 |  | 346 |  |
| Muesli/oat cereal crumbs |  | 300 |  | 300 |
| Egg white powder | 2 | 2 | 2 | 2 |
| Biscuit flavor Silesia | 0.4 |  | 0.4 |  |
| Nut flavor Quest |  | 0.4 |  |  |
| Glucose syrup type binder |  | 15 |  | 15 |
| Cold swell/pre-gel starch or flour | 20.00 | 20.00 | 20.00 | 20.00 |
| Water (Spray) | 5.00 | 10.00 | 32.00 | 40.00 |

TABLE 1-continued

|  | hard/crunchy | soft | soft |  |
| --- | --- | --- | --- | --- |
|  | g | g | g | g |
| Total crumb mix: | 400.4 | 347.4 | 400.4 | 377 |
| Nuts 2-3 mm | 1.00 | 0.00 | 1.00 | 1.00 |
| crumb mix (shell) | 23.00 | 26.00 | 23.00 | 26.00 |
| Milk crème filling ($a_W$ = 0.93) |  |  | 23.00 | 20.00 |
| Milka chocolate | 23.00 | 23.00 |  |  |
| crumb mix (cover) | 13.00 | 16.00 | 13.00 | 16.00 |
| Water spray outside | 1.00 | 1.00 | 5.00 | 5.00 |
| Total | 61.00 | 66.00 | 65.00 | 68.00 |
| post bake | 59.00 | 61.00 | 63.00 | 66.00 |

The snacks thus obtained were appealing and had a water activity of 0.7 in the case of chocolate containing snack and 0.89 in the case of the milk crème filling containing snack.

Example 2—Filled Whole Wheat Bagel or Bar

Filled whole wheat bagels or bars were prepared according to the following protocol and using the ingredients and amounts shown in Tables 2 and 3.

Procedure:
1. Knead all components of table 2 in Diosna kneader.
2. Proofing for one hour.
3. Cook dough indirectly in Stephan cutter at 67° C. for 2 min, cool and shred at 45° C.
4. Add 100 gram Purafarin SD and continue shredding while cooling; take out when loose dough crumbs are formed;
5. Shred normal bulk white bread for a few second in a Thermomix (Vorwerk).
6. Mix loose dough crumbs with normal white bread crumbs in given ratio (see table 3) by a gentle tumbler mixer (no kneading).
7. Add seeds to metal bar mould.
8. Fill crumb material obtained under item 6 (see table 3) into lower die, press first upper die at 65° C. at 4 bar for 1 second to create shell, place filling (see table 3) into the shell, add crumb mix (see table 3) on top and fix with gently pressing second upper die that was adjusted to 65° C. at 1 bar for 1 second; take out of mould and check weight, spray with water, add sesame seed.
9. Bake free for 2.5 min via IR with baking module at 50% power set of 37.5 KW unit or bake in an conventional batch oven (MIWE) at 245° C. of 6 minutes.
10. Let cool and package.

The bagels and bars thus obtained were appealing and had a water activity of about 0.95 when applying an Aw reduced cream cheese filling with an Aw of 0.97.

TABLE 2

|  | g | g |
| --- | --- | --- |
| Wheat flour | 660 | 330 |
| Whole grain flour |  | 330 |
| Water | 330 | 330 |
| Egg | 100 | 100 |
| Yeast | 50 | 50 |
| Butter | 50 | 50 |
| Caramel sugar | 0 | 20 |
| Sugar | 20.00 | 20.00 |
| Salt | 5.00 | 5.00 |
| Lactic acid 80% | 8.00 | 8.00 |
| Purafarin pre-gel flour | 100.00 | 100.00 |
| Potassium sorbate | 0.50 | 0.50 |
|  | bagel | bar |

TABLE 3

|  | g | g |
|---|---|---|
| Loose dough crumbs | 50.00 | 40.00 |
| White Bread crumbs | 50.00 | 60.00 |
| add seeds to mold | 1.00 | 1.00 |
| crumb mix (shell) | 32.00 | 16.00 |
| Filling ($a_W$ reduced cream cheese) | 25.00 | 23.00 |
| crumb mix (cover) | 13.00 | 8.00 |
| Water spray outside | 3.00 | 3.00 |
| Total | 74.00 | 51.00 |
| post bake | 71.00 | 49.00 |

The invention claimed is:

1. A process for the preparation of an encased snack comprising in this order the steps of:
   1) introducing a free flowing crumb material into a lower die, the free flowing crumb material comprising a shredded baked dough material, water, and a binder, the free flowing crumb material having a water activity level of 0.6 or more;
   2) pressing a first upper die into the lower die at a pressure between about 3 bar and about 6 bar to form an unbaked molded crumb shell having a wall with a thickness;
   3) introducing a filling into the unbaked molded crumb shell in the lower die, the filling having a second water activity level of 0.6 or more;
   4) introducing an additional free flowing crumb material onto the filling and the unbaked molded crumb shell in the lower die to provide an unbaked unmolded crumb cover; and
   5) pressing a second upper die onto the unbaked unmolded crumb cover in the lower die at a pressure between about 1 bar and about 2 bar to form an encased unbaked snack, the encased unbaked snack sealing and fully encasing the filling within the free flowing crumb material and the additional free flowing crumb material; and
   6) baking the encased unbaked snack to form an encased baked snack,
   wherein the binder reacts with the water to firm-up an outer surface of the encased baked snack, and
   the second upper die has a lower rim that extends about a recess and has a width that is approximately equal to the wall thickness of the crumb shell, the lower rim having:
   a lower surface that is configured to press edges of the unbaked unmolded crumb cover to the wall of the unbaked molded crumb shell in the lower die in response to the second upper die pressing onto the unbaked unmolded crumb cover in the lower die,
   an inner surface extending upwardly from the lower surface and defining at least a portion of the recess,
   and an outer surface opposite the inner surface and extending upwardly from the lower surface, the outer surface of the lower rim configured to contact an inner surface of the lower die when the second upper die is pressed onto the unbaked unmolded crumb cover in the lower die.

2. The process according to claim 1, wherein the free flowing crumb material further comprises material selected from the group consisting of breadstuff, cereal-based material, waste material from snack production, cheese-based material, meat-based material, soy protein-based material, tofu-based material, and combinations thereof.

3. The process according to claim 1, wherein the binder is a food grade binder.

4. The process of claim 3, wherein the food grade binder is a pre-gelatinized starch.

5. The process according to claim 1, wherein the filling is selected from the group consisting of chocolate, fruit, dairy products, vegetables, cereals, meat-based material, vegetable-based materials, vegetable-based fat, protein spreads, and combinations thereof.

6. The process according to claim 1, wherein the encased snack is baked using infrared radiation.

7. The process according to claim 1, wherein the first upper die has a top rim which is conical with an inversely angle $\alpha$.

8. The process according to claim 7, wherein the inversely angle $\alpha$ is about 45° to about 60°.

9. The process according to claim 1, wherein the free flowing crumb material has a water activity of 0.93 to 0.98 and the filling has a water activity of 0.93 to 0.98.

10. The process according to claim 1, wherein the additional free flowing crumb material forming the cover is a different material from the free flowing crumb material forming the shell.

11. The process according to claim 3, wherein the food grade binder improves the flowability of the free flowing crumb material.

12. The process according to claim 1, wherein the filling is free of preservatives.

13. The process according to claim 1, wherein the free flowing crumb material comprises rye bread crumbs, and wherein the first upper die presses into the lower die at a pressure between about 4 bar and about 6 bar.

14. The process according to claim 1, wherein the free flowing crumb material comprises biscuit crumbs, and wherein the first upper die presses into the lower die at a pressure between about 3 bar and about 5 bar.

* * * * *